(12) United States Patent
Wagle et al.

(10) Patent No.: US 11,796,811 B2
(45) Date of Patent: Oct. 24, 2023

(54) HEAD-UP DISPLAY DYNAMIC IMAGE STABILIZATION

(71) Applicant: N.S. International, Ltd., Troy, MI (US)

(72) Inventors: Saumil Satish Wagle, Mumbai (IN); Ethan Hoang To, Royal Oak, MI (US); Arul Krishna, West Bloomfield, MI (US); Xiao Zheng, Shanghai (CN)

(73) Assignee: N.S. INTERNATIONAL, LTD., Troy, MI (US)

( * ) Notice: Subject to any disclaimer, the term of this patent is extended or adjusted under 35 U.S.C. 154(b) by 48 days.

(21) Appl. No.: 17/328,643

(22) Filed: May 24, 2021

(65) Prior Publication Data

US 2022/0373797 A1    Nov. 24, 2022

(51) Int. Cl.
| G02B 27/01 | (2006.01) |
| G02B 5/10 | (2006.01) |
| G02B 7/182 | (2021.01) |
| F16F 9/30 | (2006.01) |

(52) U.S. Cl.
CPC .......... *G02B 27/0149* (2013.01); *F16F 9/306* (2013.01); *G02B 5/10* (2013.01); *G02B 7/182* (2013.01); *G02B 27/0179* (2013.01); *B32B 2307/56* (2013.01); *G02B 2027/0183* (2013.01)

(58) Field of Classification Search
CPC ...... G02B 27/0149; G02B 5/10; G02B 7/182; G02B 27/0179; G02B 2027/0183; F16F 9/306; B32B 2307/56
USPC .......................................... 359/630; 345/7–9
See application file for complete search history.

(56) References Cited

U.S. PATENT DOCUMENTS

| 3,386,527 | A | 6/1968 | Daubert et al. |
| 8,602,733 | B2 | 12/2013 | Abi-Habib et al. |
| 2018/0239150 | A1 | 8/2018 | Yoshida et al. |
| 2019/0168672 | A1* | 6/2019 | De Wind .................. B24B 9/08 |

FOREIGN PATENT DOCUMENTS

| CN | 107003524 B | * | 1/2020 | ............. B60K 35/00 |
| JP | 2019020746 A | * | 2/2019 | ............. G02B 27/01 |
| WO | 2017038498 | | 6/2018 | |

(Continued)

OTHER PUBLICATIONS

3M Vibration Damping Tapes: 434-435-436, pp. 1-3 (Year: 2013).*

(Continued)

*Primary Examiner* — William Choi
(74) *Attorney, Agent, or Firm* — Clark Hill PLC (57) ABSTRACT

The present disclosure is related to reducing shake and vibration in Head-Up Displays (HUDs) under dynamic operating conditions. The apparatus includes a curved mirror for projecting an image from a display unit on a windshield of a vehicle. The curved mirror has damping tape on its nonreflective side to absorb vibrational energy and shift the first natural frequency of the curved mirror to a higher frequency. The damping tape includes at least a viscoelastic adhesive layer and a constraining layer. The method for stabilizing the HUD includes applying damping tape selected and positioned to reduce vibrational amplitude and shift the first natural frequency of the curved mirror to a higher frequency.

8 Claims, 6 Drawing Sheets

(56) References Cited

FOREIGN PATENT DOCUMENTS

WO    2019009081    1/2019

OTHER PUBLICATIONS

Product purchase page for WOD DC-PEF06R Double Sided Foam Tape for Mounting, and Sound and Vibration Dampening Rubber Adhesive at https://tapeproviders.com/wod-dc-pef06r.html accessed on Mar. 9, 2021.
International Search Report and Written Opinion for PCTUS2237810 dated Oct. 11, 2022.

* cited by examiner

HEAD-UP DISPLAY DYNAMIC IMAGE STABILIZATION

BACKGROUND OF THE DISCLOSURE

1. Field of the Disclosure

The present disclosure relates to apparatuses and methods for stabilizing images transmitted by mirrors, and, in particular, images transmitted to windshields in vehicles to display information for drivers.

2. Description of the Related Art

Head-Up Displays (HUDs) use mirrors and optics to magnify an image and present it to a driver as a virtual reflection perceived in front of the vehicle. Some images are produced by a thin film transistors (TFTs) and projected to appear for viewing by the driver. The projected image is magnified relative to the produced image for easier viewing.

In order to accommodate drivers of different height and preferred seat positions, HUDs are often constructed to be adjustable. Some include a kinematic assembly in physical communication with one of the mirrors and that allows the driver to adjust the location of projection of the HUD display image.

Ideally, HUDs should provide a "stable" image to the driver under all driving conditions, including bumpy roads, gravel, and pot holes. Under driving conditions, bumps and other dynamic disturbances can cause the HUD image to shake. In order to avoid image shaking, HUDs are specified to have a first natural frequency over 100 Hz in order to provide a stable image; however, HUD systems with injection molded components may exhibit first natural frequencies below 100 Hz. Further, both the HUD as a system and the individual mirror component have their own first natural frequencies.

Further, space within a HUD assembly is limited and precludes the addition of a large vibration absorbing component that can interfere with operation of the kinematics of the HUD system.

What is needed is a modified concave mirror apparatus that includes an injection molded mirror and has a first natural frequency above 100 Hz at both the system and component levels that is small enough not to interfere with the kinematics of the HUD mirror.

BRIEF SUMMARY OF THE DISCLOSURE

In aspects, the present disclosure is related to apparatuses and methods for stabilizing images transmitted by mirrors, and, in particular, images transmitted to windshields in vehicles to display information for drivers.

One embodiment according to the present disclosure includes a Head-Up Display apparatus that includes a display unit; a curved mirror having a reflective side and a nonreflective side and positioned for the reflective side to reflect a visual signal transmitted by the display unit to a transparent surface; and a damping tape disposed on and covering at least part of the nonreflective side. The transparent surface may be a windshield. The damping tape may include a first layer comprising a viscoelastic material that absorbs vibrational energy and; a second layer comprising a resilient material that constrains the first layer; wherein the first layer is proximate to the nonreflective side and the second layer is distal to the nonreflective side. In some embodiments, the first layer may include polyethylene. In some embodiments, the second layer may include aluminum foil or glass cloth. The first layer may have a thickness of between about 0.05 mm and about 0.14 mm. The second layer may have a thickness of between about 0.13 mm and about 0.26 mm. In some embodiments, the at least part of the nonreflective side may include at least 50 percent of the nonreflective side. The curved mirror may be a concave or an aspheric mirror.

Another embodiment according to the present disclosure includes a method for reducing vibration in a Head-Up Display module including the step of applying at least one piece of damping tape to a nonreflective side of a curved mirror in the Head-Up Display module. The at least one piece of damping tape may be applied such that a center of mass of the damping tape coincides with a center of rotation of the nonreflective side. In some embodiments, the method may also include a step of selecting at least one dimension of the at least one piece of damping tape based on a dimension or mass of the curved mirror.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION OF THE DISCLOSURE

Generally, the present disclosure relates to methods and apparatuses for transmitting images onto a reflective surface stabilized against vibration, and, in particular, for stabilizing a projected image for a HUD on a vehicle windshield.

The present disclosure is susceptible to embodiments of different forms. They are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

Figure 1:
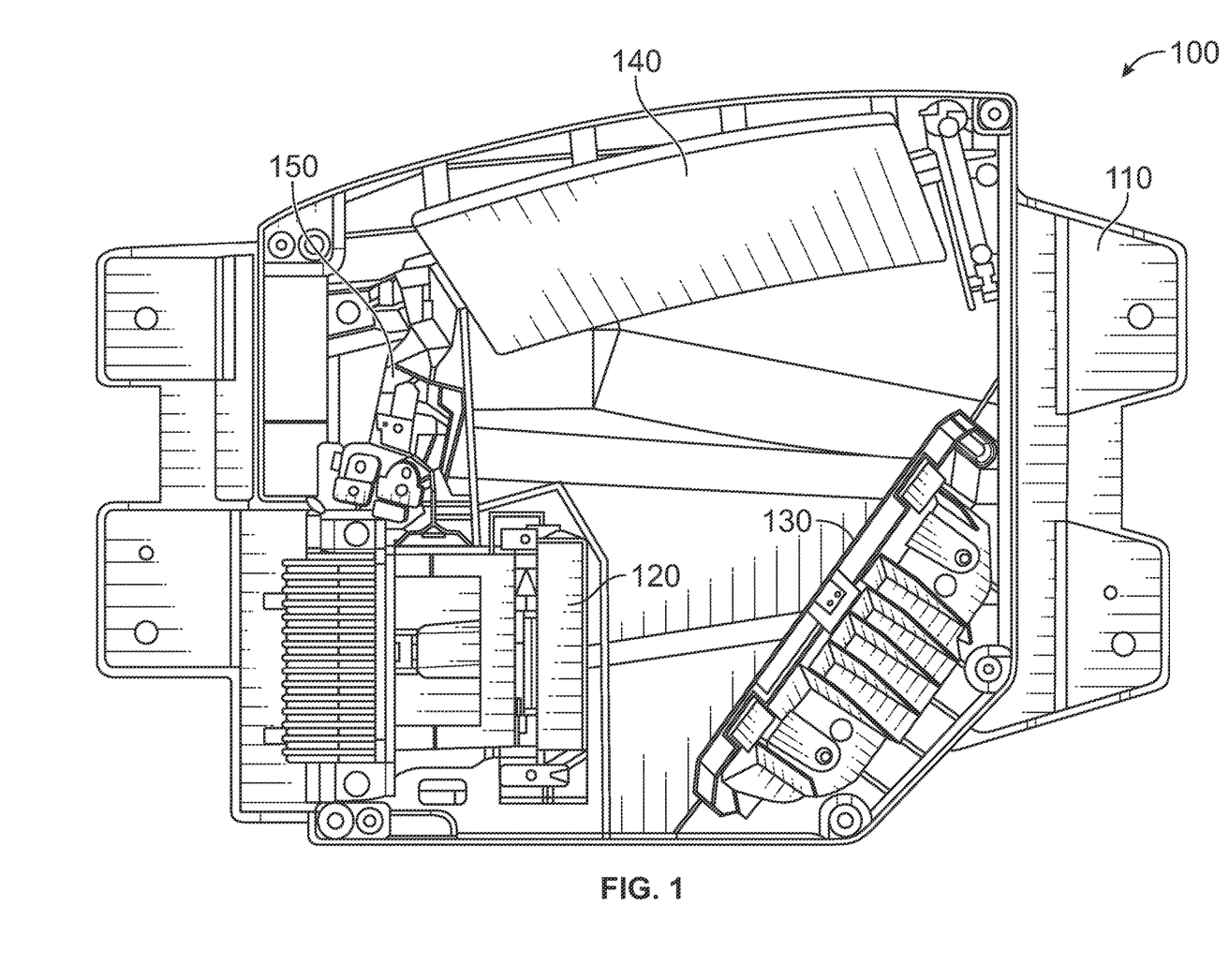
FIG. 1 is a diagram of a Head-Up Display (HUD) system according to one embodiment of the present disclosure.

FIG. 1 shows a diagram of a Head-Up Display (HUD) module 100 according to one embodiment of the present disclosure. The HUD module 100 may include a housing 110 with a display unit 120 disposed within. A flat mirror 130, a curved mirror assembly 140, and a kinematic assembly 150 are also disposed within the housing 110. The kinematic assembly 150 is in physical communication with the curved mirror assembly 140. The flat mirror 130 is positioned to receive an output signal from the display unit 120 and reflect the signal to the curved mirror assembly 140. The curved mirror assembly 140 may be aspheric and/or concave in shape and positioned to receive the reflected signal from the flat mirror 130. The kinematic assembly 150 is configured to adjust the position of the curved mirror assembly 140 to change the direction of the reflection of the signal from the display unit 120 leaving the HUD module 100. This ability to change reflection direction enables the curved mirror assembly 140 to project a HUD image display at different heights and positions on a windshield to accommodate vehicle operators and/or observers with varying heights and viewing preferences.

Figure 2:
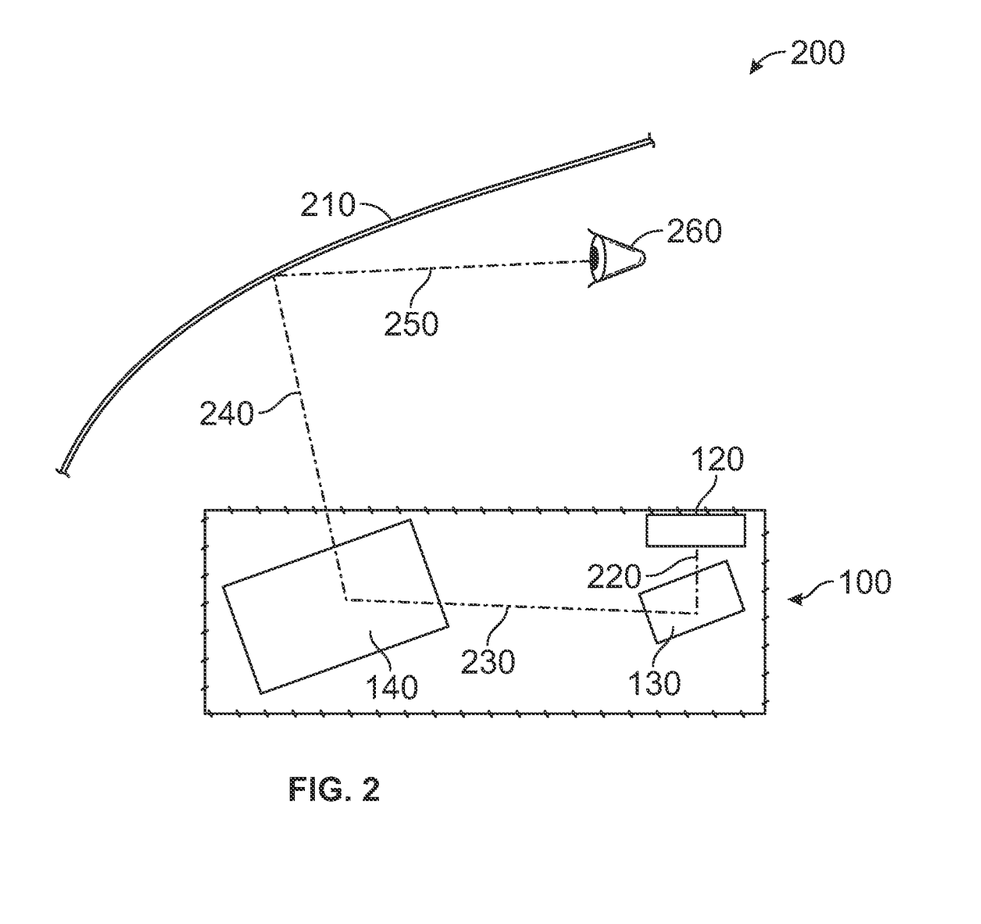
FIG. 2 is a diagram of how the HUD system of FIG. 1 projects a display onto a windshield for viewing by a driver according to one embodiment of the present disclosure.

FIG. 2 shows a diagram of a HUD system 200 in operation along with a light path from the HUD module 100 is in operation in a vehicle, such that a windshield 210 or another transparent reflective surface is present. The display unit 120 produces an optical signal 220 that reflects off the flat mirror 130. The reflected signal 230 is transmitted to the curved mirror assembly 140, where it is reflected as a second reflected signal 240 to the windshield 210. Some of the second reflected signal 240 produces a windshield reflection 250 that is viewable by an eye 260 of a vehicle operator. During operation, vibrations in the vehicle are transmitted though the body of the vehicle to the HUD module 100. While most vehicle operations involve some vibrations, there are circumstances where the amplitude and/or frequency of the vibrations reaching the curved mirror assembly 140 can distort the shape of the curved mirror 140 and result in a distorted image being viewed by the vehicle operator unless the curved mirror assembly 140 includes a vibration damping component as discussed below.

Figure 3A:
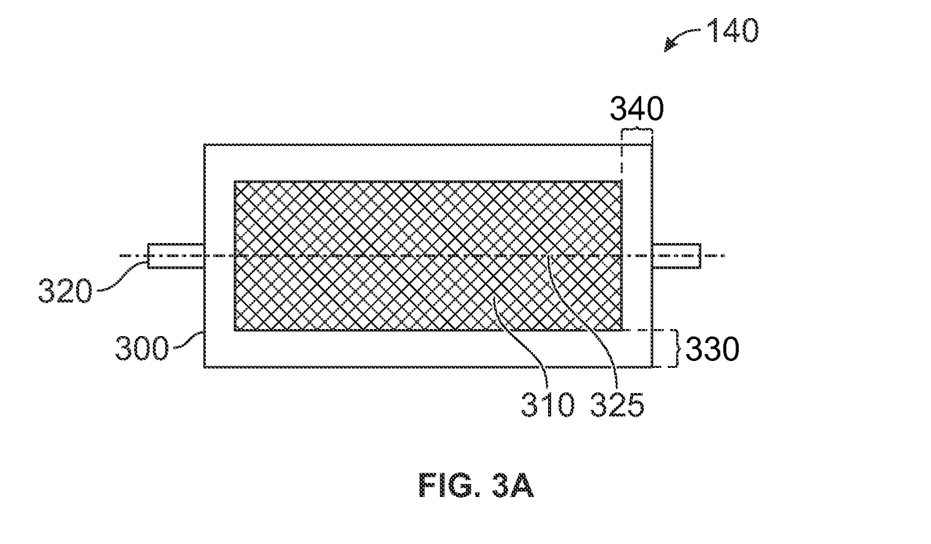
FIG. 3A is a rearview diagram a mirror assembly for HUD system of FIG. 1.

FIG. 3A shows a rear diagram of the curved mirror assembly 140 according to one embodiment of the present disclosure. The curved mirror assembly 140 may include a curved mirror 300, a damping tape 310, and a mounting 320. The mounting 320 is affixed to the mirror 300 and in physical communication with the kinematic assembly 150 such that the mirror 300 orientation may be adjusted by operation of the kinematic assembly 150. The damping tape 310 may be a noise, vibration, and harshness (NVH) tape, such as a Vibration Damping Tape manufactured by 3M of St. Paul, Minn. or a Vibration Damping Material manufactured by Nitto Denko of Osaka Japan. The damping tape 310 may cover some or all of the back (nonreflective) surface of the mirror 300. The damping tape 310 is configured to reduce the amplitude of vibrations in the mirror 300 while increasing the first natural frequency of the mirror 300 to reduce optical distortion detected by the vehicle operator. In some embodiments, the damping tape 310 may have a surface coverage of the mirror 300 that is less than the surface area of the back-surface (often a nonreflective surface) side of the mirror 300. In some embodiments, the damping tape 310 may not cover a selected length portion 330 of the mirror 300 and/or a selected width portion 340 of the mirror 300. In some embodiments, these uncovered distances 330, 340 may form a perimeter around the damping tape 310. While the damping tape 310 coverage is shown as rectangular, this is illustrative and exemplary only, as the coverage of the damping tape 310 may be any shape. The selected length portion 330 and the selected width portion 340 may have the same or different magnitudes. In some embodiments, the selected length portion 330 and the selected width portion 340 may be based on the actual length and width of the mirror 300. In some embodiments, the selected width portions 340 may be selected so that the damping tape 310 is centered along an axis of rotation 325 of the curved mirror, where said axis of rotation is defined by the mirror mounting 320.

Figure 3B:
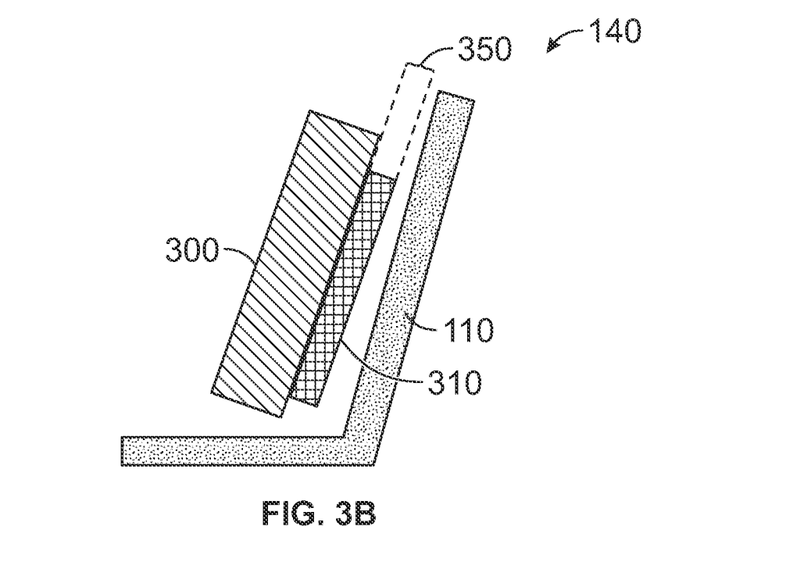
FIG. 3B is a side view diagram of the mirror assembly in the HUD of FIG. 1.

FIG. 3B is a side diagram of the mirror assembly 140 disposed by the housing 110. The damping tape 310 has a thickness 350. The thickness 350 may be varied based on one or more of the desired amplitude damping, space available between the mirror assembly 140 and the housing 110, and the desired frequency shifting. In some embodiments, the thickness 350 may be between about 0.19 mm and about 0.40 mm.

Figure 4A:
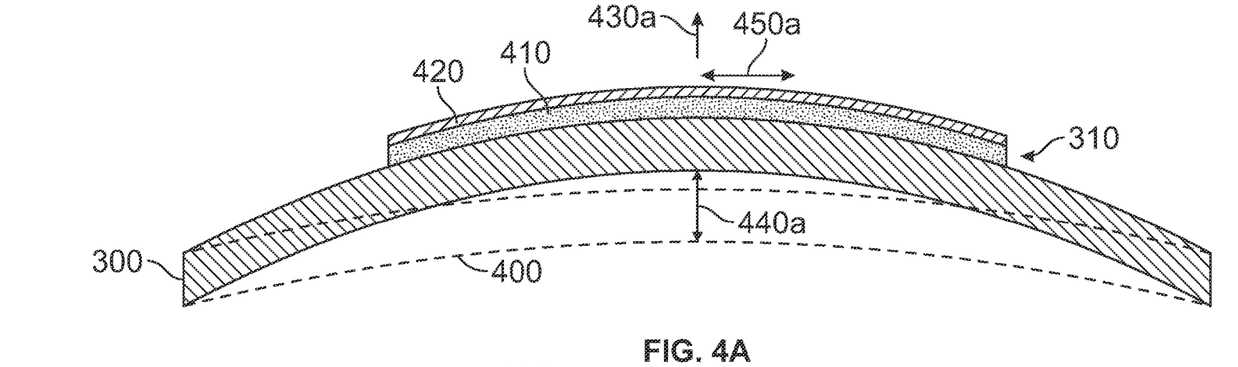
FIG. 4A is a side view diagram of the mirror assembly of FIG. 1 when tension force is induced on the mirror assembly by vibration.
Figure 4B:
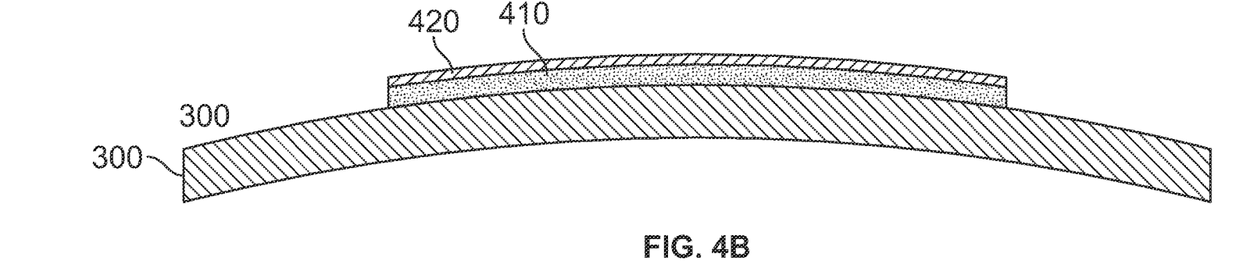
FIG. 4B is a side view diagram of the mirror assembly of FIG. 4A in an unstressed state.
Figure 4C:
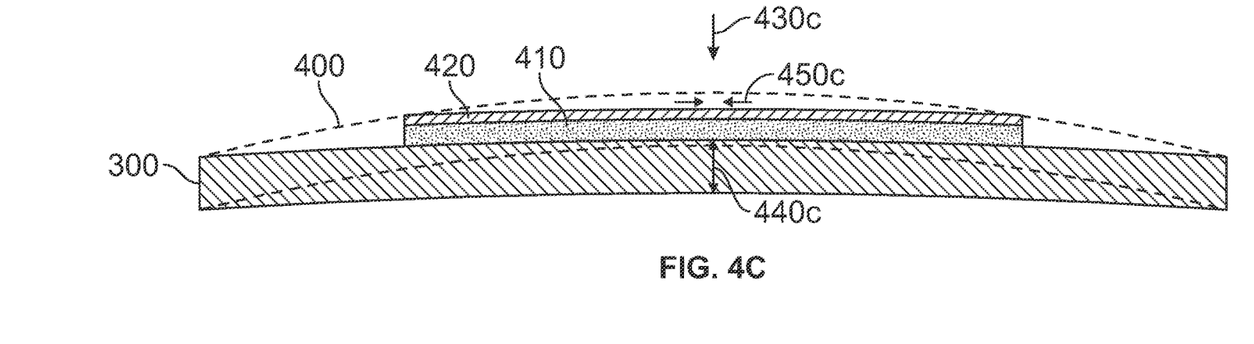
FIG. 4C is a side view diagram of the mirror assembly of FIG. 4A when compression force is induced on the mirror assembly by vibration.

FIGS. 4A-4C show diagrams of the curved mirror 300 and the damping tape 310 of the curved mirror assembly 140 under various states of stress due to vibrations with FIG. 4B being the unstressed state. FIG. 4B is a diagram of the curved mirror 300 and damping tape 310 when unstressed by vibrations. The curved mirror 300 is aspheric or concave. The degree of curvature of the curved mirror 300 will vary when vibrational energy passes through it. The damping tape 310 is made up of at least two layers. The inner layer 410 may abut the curved mirror 300 and may include a viscoelastic acrylic polymer material with vibration damping properties. In some embodiments, the inner layer may be made of polyethylene. The outer layer 420 may include a backing material with a stiffness greater than the stiffness of the curved mirror 300. In some embodiments, the outer layer 420 may be made of, but is not limited to, aluminum foil and glass cloth. In some embodiments, the inner layer 410 may have a thickness of about 0.05 mm to about 0.14 mm. In some embodiments, the outer layer 420 may have a thickness of about 0.13 mm to about 0.26 mm.

FIG. 4A shows the mirror 300 of FIG. 4B flexing under forces due to vibration that are increasing the curvature of the curved mirror 300. Outline 400 illustrates the unstressed position of the curved mirror 300 from FIG. 4B for contrast. The force 430a of the vibration to increase the curvature of the curved mirror 300 is transmitted through the curved mirror 300 to the damping tape 310 and is shown as a tension force 450a along the damping tape 310. The damping tape 310 resists the change in dimension and absorbs some of the vibrational energy imparted on the mirror 300. This reduces the amplitude of deflection 440a induced in the mirror 300 by the force 430a. The inner layer 410 provides vibrational damping to reduce the amplitude of excitation. The outer layer 420 stiffens the mirror 300 and the mirror assembly 140 to resist the tension force 450a. The damping tape 310 may be selected from a material that is certified as suitable for motor vehicles and meet environmental test standards for the same. Examples of suitable materials for damping tape 310 include viscoelastic acrylic polymer adhesives bonded with a constraining layer, such as, but not limited to, 3M Vibration Damping Tape 435, 3M Vibration Damping Tape 434, 3M Damping Foil 2552, Nitto Denko High Function Vibration Damping Material Legotolex D-350, and Nitto Denko Pressure Sensitive Constrained-Layer Damper 1432F.

FIG. 4C shows the mirror 300 of FIG. 4A flexing under forces due to vibration in the opposite direction as in FIG. 4B, such that the curvature of the curved mirror 300 is decreased as the vibration passes through it. The force 430c of the vibration to decrease the curvature of the curved mirror 300 is transmitted through the mirror 300 to the damping tape 310 and is shown a compression force 450c along the damping tape 310. The damping tape 310 resists the change in dimension and absorbs some of the vibrational energy imparted on the mirror 300. This reduces the amplitude of deflection 440 induced in the mirror 300 by the force 430. As in FIG. 4B, the inner layer 410 provides vibrational damping to reduce the amplitude of excitation. The outer layer 420 stiffens the mirror 300 and the mirror assembly 140 to resist the compression force 450c.

Figure 5:
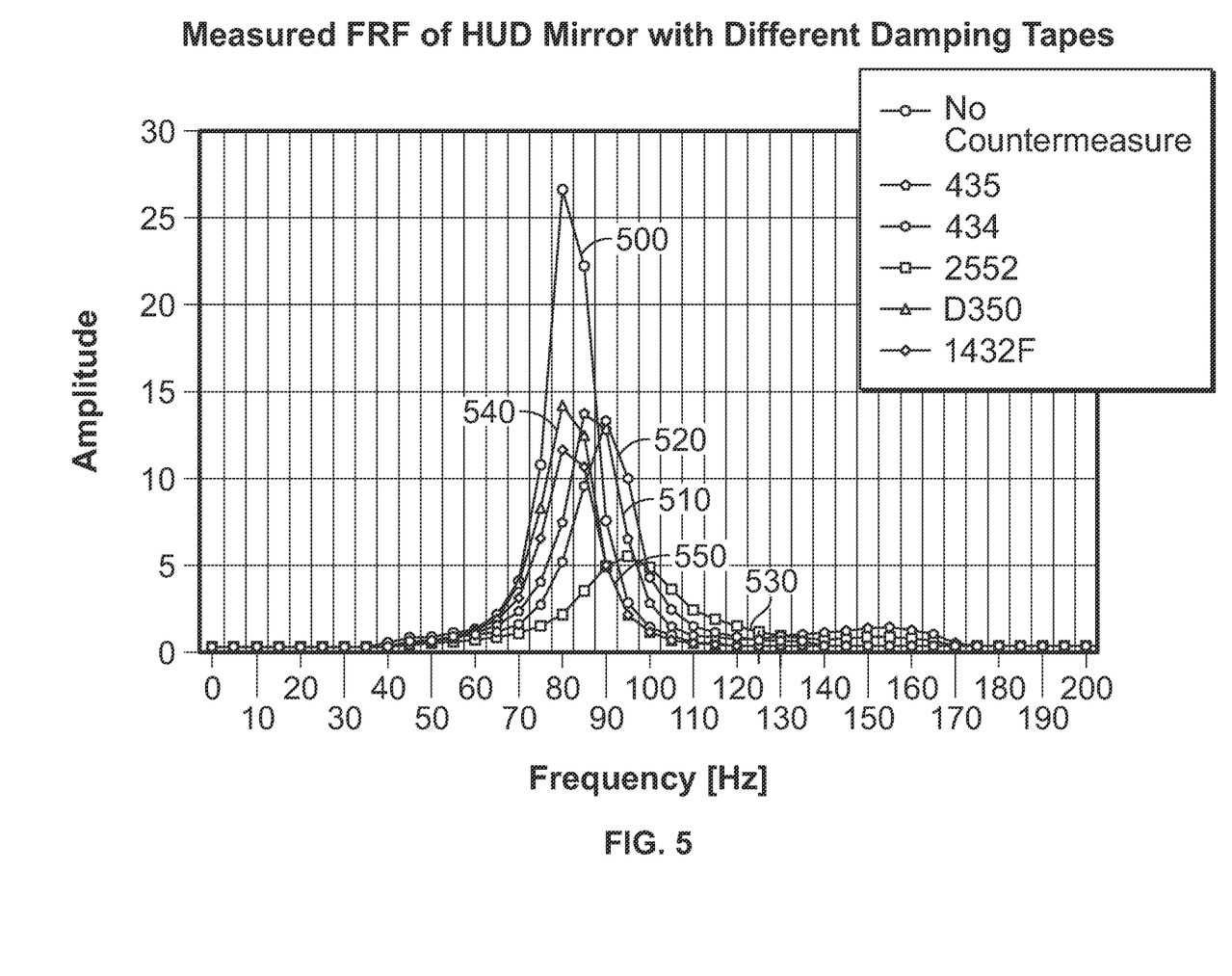
FIG. 5 is a graph of frequency damping with different embodiments according to the present disclosure.

FIG. 5 shows a graph of performance curves of different curved mirrors 140 exposed to vibration and the resulting vibrational frequency and amplitude. The curve 500 shows a vibration response of the curved mirror 300 without any damping tape 310, and, thus, serves as a control. The curve 510 shows a vibration response of the curved mirror 300 where the damping tape 310 is 3M Vibration Damping Tape 435. The curve 520 shows a vibration response of the curved mirror 300 the damping tape 310 is 3M Vibration Damping Tape 434. The curve 530 shows a vibration response of the curved mirror 300 where the damping tape 310 is 3M Damping Foil 2552. The curve 540 shows a vibration response of the curved mirror 300 where the damping tape 310 is Nitto Denko High Function Vibration Damping Material Legotolex D-350. The curve 550 shows a vibration response of the curved mirror 300 where the damping tape 310 is Nitto Denko Pressure Sensitive Constrained-Layer Damper 1432F.

As can be seen when comparing the curves 510-550 against the control curve 500, in all instances, the presence of the damping tape 310 reduced the amplitude of the vibration and shifted the frequency of the vibration higher, both of which improve the quality of the HUD signal displayed to the operator of the vehicle. The curve 530 shows a reduction in peak amplitude of about 80 percent while shifting the first natural frequency of the peak from about 82 Hz to about 97 Hz.

Figure 6:
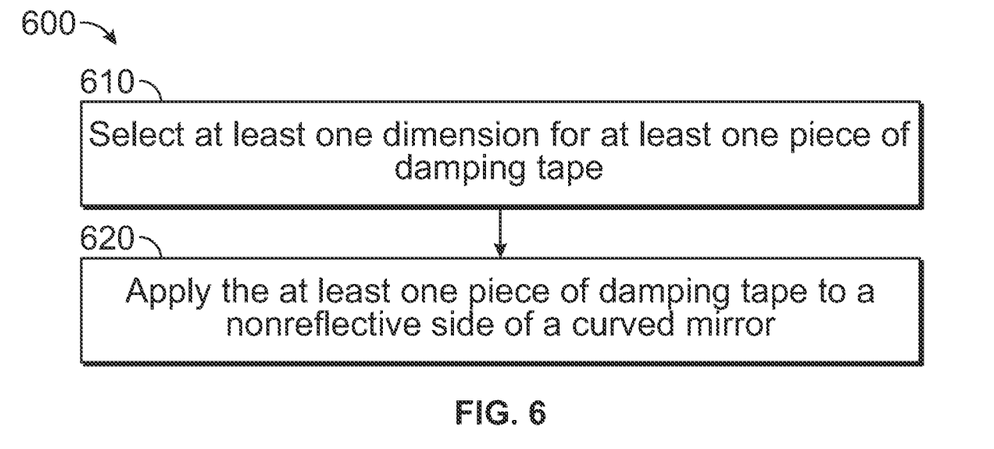
FIG. 6 shows a flow chart of a method for making an embodiment of the HUD system in FIG. 1.

FIG. 6 shows of flow chart for a method 600 of modifying the curved mirror 140 to reduce vibrational amplitude and increase the first natural frequency of the curved mirror 140 and associated HUD module 100. In step 610, select at least one dimension or shape for at least one piece of damping tape 310. The piece of tape may be selected based on one or more of length, width, and thickness and may be in any shape or multiple pieces of tape may be used. The selection of the dimensions of and materials in the damping tape 310 may be based on properties of the curved mirror 140 and/or the HUD module 100. In step 620, apply the at least one piece of damping tape 310 to the back side (nonreflective side) of the curved mirror 140 of the HUD module 100. In some embodiments, the center of gravity of the damping tape 310 may coincide with the center of rotation of the back side of the curved mirror 620. Step 620 may be performed during original manufacturing of the HUD module 100 or be performed during retrofit.

While the disclosure has been described with reference to exemplary embodiments, it will be understood that various changes may be made, and equivalents may be substituted for elements thereof without departing from the scope of the disclosure. In addition, many modifications will be appreciated to adapt a particular instrument, situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A Head-Up Display apparatus comprising:
   a display unit;
   a curved mirror having a reflective side and a nonreflective side and positioned for the reflective side to reflect a visual signal transmitted by the display unit to a transparent surface; and
   a damping tape disposed on and covering at least part of the nonreflective side, wherein the damping tape is configured to reduce vibration in the curved mirror and comprises:
      a first layer comprising a viscoelastic material that absorbs vibrational energy; and
      a second layer comprising a resilient material that constrains the first layer;
      wherein the first layer is proximate to the nonreflective side and the second layer is distal to the nonreflective side.

2. The apparatus of claim 1, wherein the transparent surface is a windshield.

3. The apparatus of claim 1, wherein the first layer comprises polyethylene.

4. The apparatus of claim 1, wherein the second layer comprises aluminum foil.

5. The apparatus of claim 1, wherein the first layer has a thickness of between about 0.05 mm and about 0.14 mm.

6. The apparatus of claim 1, wherein the second layer has a thickness of between about 0.13 mm and about 0.26 mm.

7. The apparatus of claim 1, wherein the at least part of the nonreflective side comprises at least 50 percent of the nonreflective side.

8. The apparatus of claim 1, wherein the curved mirror is a concave mirror.

* * * * *